United States Patent [19]

Schappler et al.

[11] Patent Number: 5,560,688

[45] Date of Patent: Oct. 1, 1996

[54] PRESSURE CONTROL APPARATUS FOR ADJUSTING BRAKE PRESSURE IN A VEHICLE

[75] Inventors: Hartmut Schappler; Jörg Schröder-Berg; Detlev Neuhaus, all of Hanover, Germany

[73] Assignee: Wabco Vermögensverwaltungs-GmbH, Hanover, Germany

[21] Appl. No.: 394,313

[22] Filed: Feb. 22, 1995

[30] Foreign Application Priority Data

Feb. 25, 1994 [DE] Germany ............... 44 06 235.4

[51] Int. Cl.$^6$ ............................... B60T 13/74
[52] U.S. Cl. ............... 303/3; 303/20; 303/15; 303/155
[58] Field of Search ............... 303/3, 15, 20, 303/155, 157, 158, 118.1

[56] References Cited

U.S. PATENT DOCUMENTS

| 4,093,317 | 6/1978 | Lindemann et al. | 303/118.1 X |
|---|---|---|---|
| 4,555,766 | 11/1985 | Wright | 303/155 |
| 4,743,072 | 5/1988 | Brearly | 303/155 |
| 5,150,298 | 9/1992 | Fujioka et al. | 303/157 X |

FOREIGN PATENT DOCUMENTS

| 0014369 | 12/1981 | European Pat. Off. . |
|---|---|---|
| 2811345 | 9/1979 | Germany . |
| 3444827 | 6/1986 | Germany . |
| 3603810 | 8/1987 | Germany . |
| 3636140 | 4/1988 | Germany . |
| 3636141 | 4/1988 | Germany . |
| 3705333 | 3/1990 | Germany . |

*Primary Examiner*—Lee W. Young
*Attorney, Agent, or Firm*—Meltzer, Lippe, Goldstein, et al.

[57] ABSTRACT

A pressure control apparatus for adjusting the brake pressure in a braking system of a vehicle comprises a reservoir in which a pressure fluid is stored, an outlet through which the pressure fluid is discharged, at least one brake cylinder of the braking system, inlet and outlet valves through which the pressure fluid is supplied to and discharged from the brake cylinder, and a digital controller which controls the opening and closing of the inlet and outlet valves to minimize the deviation between an actual value and a command variable. The digital controller comprises individual controllers associated with the inlet and outlet valves. The individual controllers operate in accordance with a changeable PIDD$^2$ control formula. The digital control further comprises a three-stage controller connected downstream of the individual controllers and adjustable low pass filters for the inlet and outlet valves. A pressure phase detector determines the current pressure phase to be set (i.e., increase, maintain or decrease) based on the command variable, and adjusts the operation of the individual controllers, the three-stage controller, and the low pass filters based on the current pressure phase.

18 Claims, 5 Drawing Sheets

PRESSURE CONTROL APPARATUS FOR ADJUSTING BRAKE PRESSURE IN A VEHICLE

FIELD OF THE INVENTION

The present invention relates to a pressure control apparatus having a digital control. More specifically, the invention relates to such a device which is used for the adjustment of brake pressures in a vehicle.

BACKGROUND OF THE INVENTION

In a conventional vehicle, the brake is no longer necessarily operated by means of a pneumatic control pressure; it can also be operated by an electrically transmitted signal whereby the brake pedal emits an electric signal when it is actuated by the driver. This signal is electronically processed and is used to adjust the brake pressure in the brake cylinders of the vehicle by means of solenoid valves, as disclosed by German patent document DE 36 03 810 A1. In such electric braking systems, synchronization, repeatability, precision of set brake pressures and safety requirements must be high. If an anti-lock braking system (ABS) is available, the pressure modulators or solenoid valves (MV) used for pressure control must also function very rapidly, so that the desired pressures can be achieved within the usual ABS-control cycle of 2 to 5 seconds.

In the simplest case, the solenoid valves can be switching open/close valves which are actuated electrically and are either fully open or fully closed. The braking pressure can be increased, maintained or lowered using such valves. The changes in the brake pressure occur in steps.

It is also possible to use pressure modulators which are able to set the desired pressures in an analogous manner. However, these are relatively expensive and not especially rapid.

Stepping solenoid valves which are actuated electrically with a frequency that is higher than their own frequency, e.g., 30 Hz, can also be used, as disclosed in European Patent EP 0 014 369 B1. In this manner, the solenoid valve can be operated within a relatively narrow working range in the form of a continuously adjustable throttling point. The comfort of control with such a valve is greater than with a purely open/close valve and the wear of the valve seats is reduced. However, considerable problems occur in the control because such a solenoid valve is subject to delay time, greatly prone to hysteresis, has non-linear operating characteristics, and is sensitive to the limitations of manufacturing tolerances and aging.

Additional problems in brake pressure control in a utility vehicle result from the non-linearity of the transmission path, i.e., the pipe and hose lines, and the volume to be controlled, i.e., the brake cylinder. Thus, for example, pressure oscillations may occur in the presence of a large gradient in volume flow. Additional non-linearities result from the fact that the brake cylinder has a highly changeable volume. Furthermore, temperature equalization effects occur in the brake cylinder even when the solenoid valve is closed, i.e., the brake cylinder pressure changes slowly with temperature changes, even when there is no change in volume.

SUMMARY OF THE INVENTION

It is an object of the present invention to provide a pressure control device for the adjustment of braking pressures in a vehicle. The device accounts for all of the above identified problems which occur when braking pressure is controlled in utility vehicles and can set the desired braking pressures rapidly and without overshooting.

The inventive pressure control apparatus for adjusting the brake pressure in a braking system of a vehicle comprises a reservoir in which a pressure fluid is stored, an outlet through which the pressure fluid is discharged, at least one brake cylinder of the braking system, inlet and outlet valves through which the pressure fluid is supplied to and discharged from the brake cylinder, and a digital monitoring controller which controls the opening and closing of the inlet and outlet valves to minimize the deviation between an actual value and a command variable. The digital monitoring controller comprises individual controllers associated with the inlet and outlet valves which operate in accordance with a changeable $PIDD^2$ control formula. The digital monitoring control further comprises a three-stage controller connected downstream of the individual controllers and adjustable low pass filters for the inlet and outlet valves. A pressure phase detector determines the current pressure phase to be set (i.e., increase, maintain, or decrease) based on the command variable, and adjusts the operation of the individual controllers, the three-stage controller, and the loss pass filters based on the current pressure phase.

DETAILED DESCRIPTION OF THE INVENTION

Figure 1:
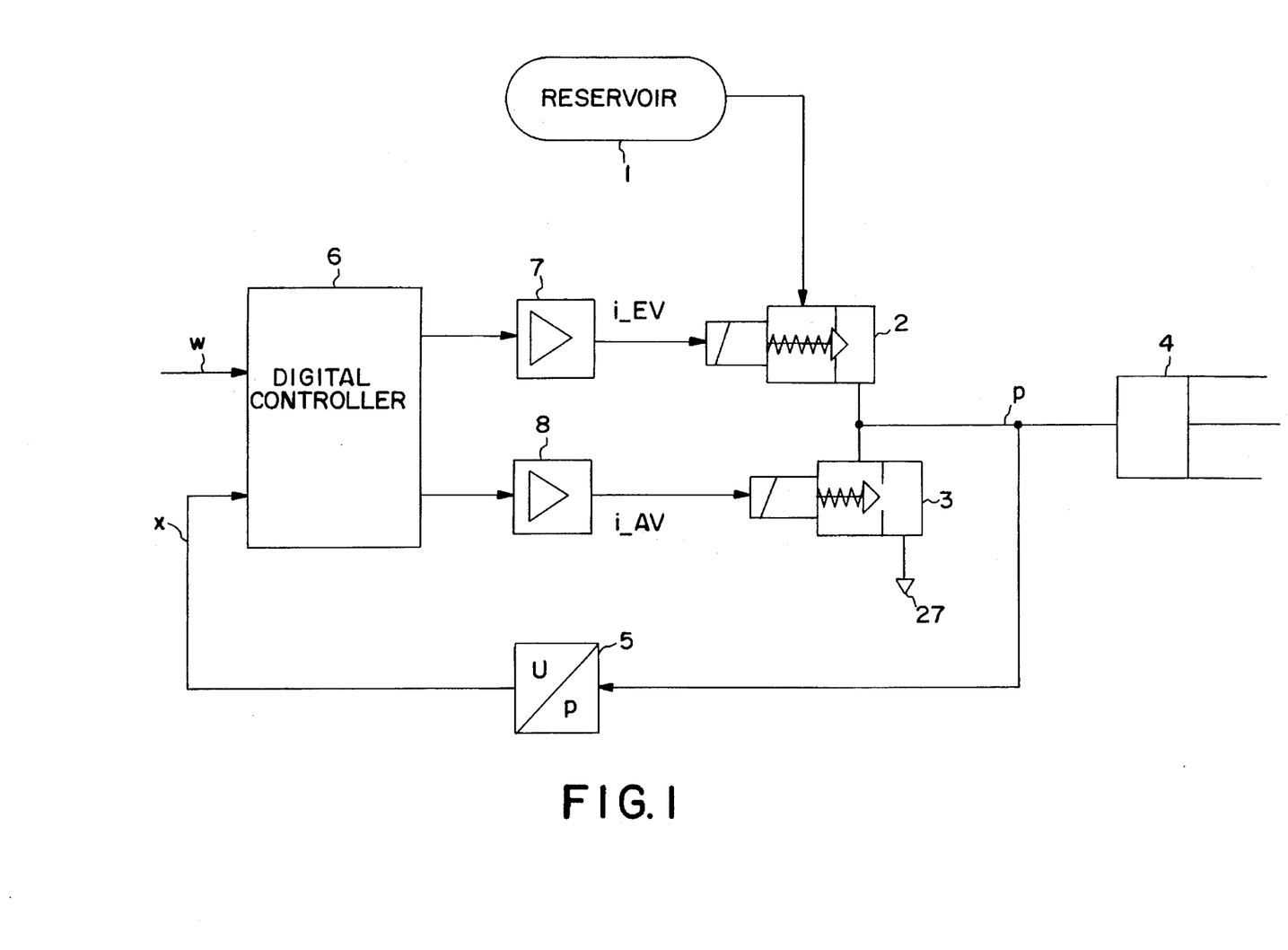
FIG. 1 illustrates a schematic circuit diagram of a pressure control apparatus for an electric braking system of a vehicle.

FIG. 1 shows a schematic circuit diagram of a pressure control apparatus. In a brake cylinder (4), a braking pressure which follows the value of a command variable w as rapidly and as precisely as possible is to be set. To increase the pressure, an inlet valve (2), such as a solenoid valve, is used. The inlet valve (2) connects a pressure fluid reservoir (1) to the brake cylinder (4). A discharge valve (3) is used to lower the pressure and is able to divert the pressure fluid to an outlet or pressure sink (27). The pressure fluid can be compressed air or oil. To maintain the pressure in the brake cylinder (4), both valves (2, 3) are closed. The actual pressure p is transmitted to a pressure sensor (5) and converted into a proportional output voltage. The proportional output voltage is then transmitted in the form of an actual value x to a digital monitoring or scanning controller (6). The controller (6) compares the command variable w with the actual value x in a known manner and, in case of possible deviations, transmits corresponding control signals via amplifiers (7, 8) to the control valves, i.e., to the inlet valve (2) and discharge valve (3), in order to minimize any possible deviations. The monitor controller (6) has analog/digital converters at its inputs and is thus also able to process analog input signals. These analog signals are scanned in a known manner and are converted into a digital number for further processing.

Figure 2:
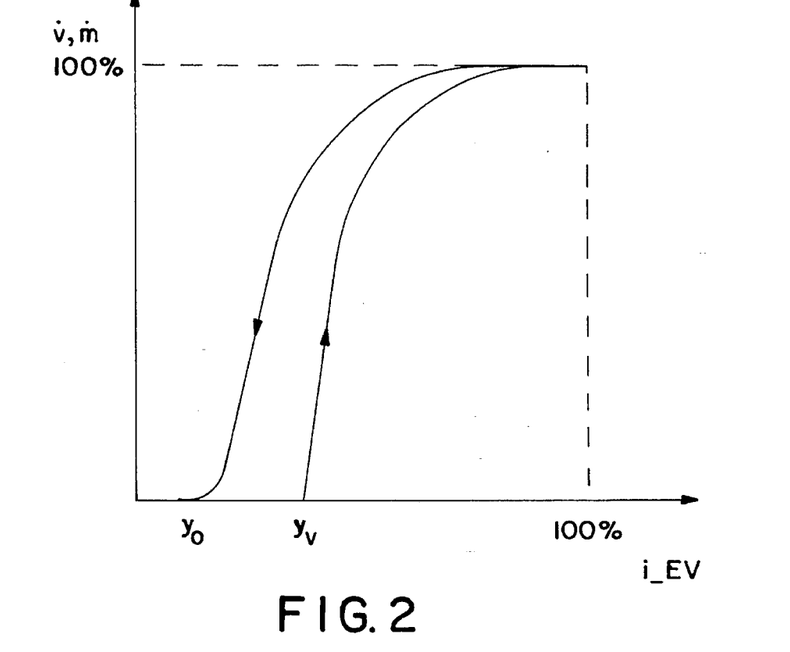
FIGS. 2 & 3 are diagrams illustrating the delay time and the hysteresis behavior of the solenoid valves (inlet valve denoted EV and outlet valve denoted AV) of the braking system.

In FIG. 2 the characteristic response curve of the inlet valve (EV) (2) is shown. A control current i of 0–100% is entered on the abscissa in standard form. The volume flux $\dot{v}$ or mass flux $\dot{m}$ of 0–100% is shown along the ordinate, also in standard form.

As shown in FIG. 2, the inlet valve begins to open only after an actuation value $Y_v$ is reached because of the initial hysteresis of the valve. As the control current increases, opening of the valve takes place, first in a linear manner, and then in a nonlinear manner, until the valve is completely open.

During closing of the valve, the same non-linearity occurs and additional hysteresis takes place. The valve is completely closed again when the control current value is $y_o$.

Figure 3:
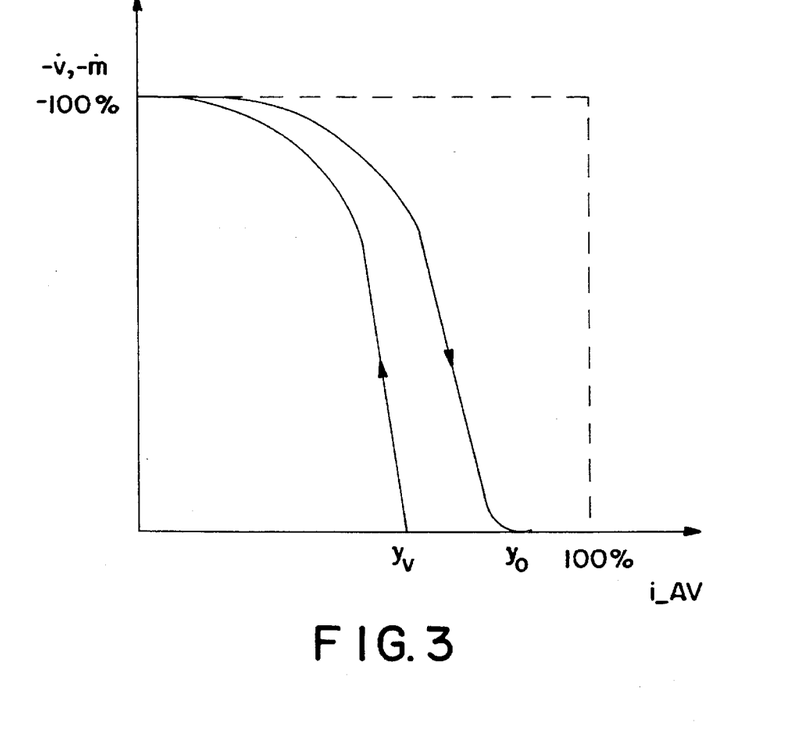

The corresponding opening and closing behavior of the discharge valve (AV) (3) is shown in FIG. 3.

As shown in FIGS. 2 and 3, the inlet and discharge valves (2,3) in the form of valve seats have long response delay times at each start or change in pressurization or venting, and, therefore, introduce a delay time behavior into the control circuit. Only when an opening control current value corresponding to $Y_v$ which is approximately 40% of the maximum control current value is reached in the actuating magnets and a corresponding perviousness of the sealing surface is produced, does a volume/mass flux ($\dot{v}$, $\dot{m}$) of the pressure fluid occur in the brake line.

Figure 4:
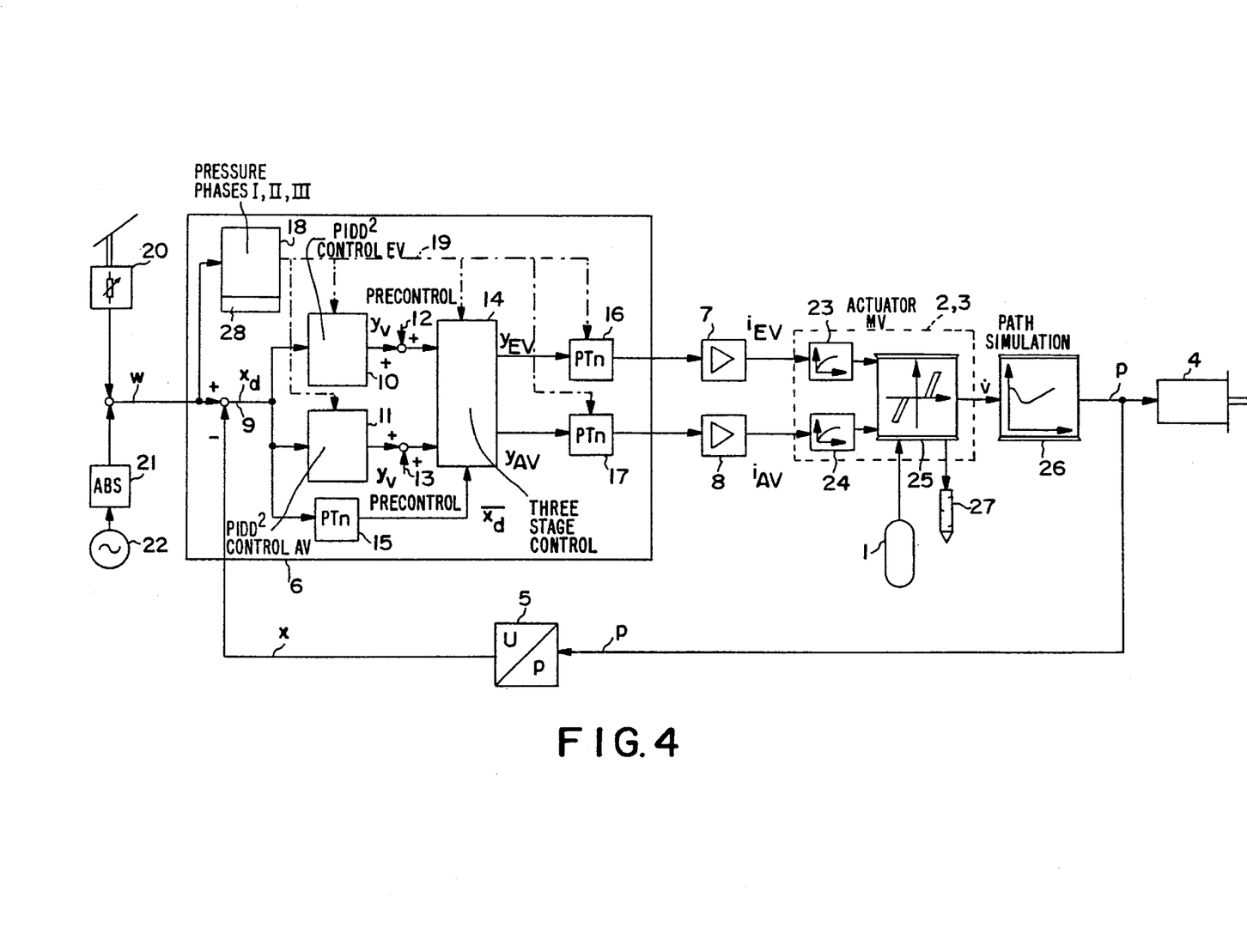
FIG. 4 illustrates in greater detail a circuit diagram of the pressure control apparatus according to the invention, including components which are part of the control circuit.

FIG. 4 shows in detail a circuit diagram of the pressure control device according to the present invention. An electrical signal from a pedal-operated (so-called) brake valve (20) is transmitted to the controller (6) as the command variable w. The pedal-operated brake valve (20) produces an electric output, whereby the output voltage corresponds, for example, to the position of the pedal or the braking demand of the driver. The output signal of an ABS electronic system (21) is transmitted as another command variable to the controller (6). The rotational behavior of the vehicle wheels is monitored by wheel sensors (22). The ABS system (21) transmits a command signal in a known manner to relax the appertaining brake cylinder in the case of excessive brake slip. By applying appropriate measures, the output signal of the electronic ABS system (21) is transmitted with priority over the output signal of the pedal-operated brake valve (20). Additional input values (not shown), e.g., the signal of a hand brake, can also be transmitted to the controller.

The controller (6) compares the actual pressure value x with the command variable w in a subtractor (9), so that the deviation $x_d$ is obtained. The deviation $x_d$ is transmitted to a first PIDD$^2$ controller (10) for controlling the inlet valve EV (2) and to a second PIDD$^2$ controller (11) for controlling the discharge valve AV (3). (The term PIDD$^2$ will be explained more fully below.) The two PIDD$^2$ controllers (10, 11) amplify the deviation $x_d$. The precise amplification characteristic or structure of the PIDD$^2$ controllers can be changed by a pressure phase detector (18) via connection paths (19) (shown as dashed lines) leading to the PIDD$^2$ controllers (10, 11). The pressure phase detector (18) receives the value of the command variable w as an input signal and detects which pressure phase, i.e., pressure phase I=pressure build-up, pressure phase II=maintain pressure, pressure phase III=pressure reduction, applies at that moment. This detection is accomplished by comparing the current command variable w with the past history of the command variable w, which is stored in the pressure phase detector (18).

The output signals of the two PIDD$^2$ controllers (10, 11) are first transmitted to summation points 12, 13, where precontrolling is possible. Here the known disturbance variables, e.g., the pressure in the reservoir (1) and the operating voltage $U_B$ of the electronics, can be added in. Thus, the influence of those disturbance variables can be accounted for more rapidly.

The values formed are then transmitted to a three-stage controller (14) which can also be switched by the pressure phase detector (18). Additionally, the deviation $x_d$ is transmitted as a median value $\overline{X}_d$ to the three-stage controller (14) via a low pass filter (15).

The two output signals of the three-stage controller (14), i.e., $Y_{EV}$ for the inlet valve EV and $Y_{AV}$ for the discharge valve AV, are transmitted through respective low pass filters (16, 17). The characteristics of the two low pass filters (16,17) can also be changed by the pressure phase detector (18), so that different attenuation results depending on the current pressure phase.

The two output signals from the low pass filters (16, 17) are amplified in amplifiers (7, 8) following appropriate digital/analog conversion and are transmitted to the actuator. The actuator comprises the solenoid valves (2,3). The control system is represented by the magnetic functions (23, 24) of the valves (2,3) and the valve characteristic response curves (25). See FIGS. 2, 3. The characteristics of the operating magnets result in an additional low pass characteristic.

The pressure fluid reservoir (1) and the outlet (27) are connected to the actuator (2,3). The output pressure of the actuator (2,3) is transmitted to the brake cylinder (4) via pressure fluid pipes and hoses, which are shown as path simulation (26). The braking pressure p is transmitted to the brake cylinder (4) and retransmitted to the controller (6) in the form of an actual value x via a pressure sensor or pressure/voltage converter (5)

The operation of the controller (6) shown schematically in FIG. 4 is explained in further detail with reference to FIG. 5. In the upper half of FIG. 5, a command variable w, the resulting pressure p (actual value), and their difference, i.e., the deviation $x_d$, are plotted against time t. Three different pressure phases can be distinguished: Phase I=pressure buildup, Phase II=maintain pressure, and Phase III=pressure reduction.

In the lower half of FIG. 5, the switching on and off of a timing circuit, as described below, with switch-on time $T_A$ is shown.

In order to attain the desired control, as described above, while also taking into account the path conditions, a control formula having a switchable structure and parameters in accordance with a decision strategy is described below.

The first part of the controller (6) comprises a basic structure with two single controllers (10, 11), one for the inlet valve and one for the outlet valve, which follow a PIDD$^2$ algorithm.

The second part of the controller (6) comprises a three-stage controller (14) with a dynamically adapted valve control characteristic. The actuation of the solenoid valves (EV, AV) with the inclusion of the results from the PIDD$^2$ algorithm is effected via the three-stage controller (14). The outputs of the controller (14), $Y_{EV}$ and $Y_{AV}$, are transmitted to the solenoid valves (2, 3) either with heavy filtering or without filtering, depending on the decision strategy, as discussed below.

In the pressure phase detector (18), the gradient and the signal history of the command variable w are used as criteria for adaptation of the controllers (10, 11). The current pressure phase to be set is derived from an earlier pressure phase. By means of a suitable selection of parameters, an asymptotic course of the actual pressure p compared to the command variable w, is desired. Counter-control of control signal excesses is usually not necessary.

Figure 5:
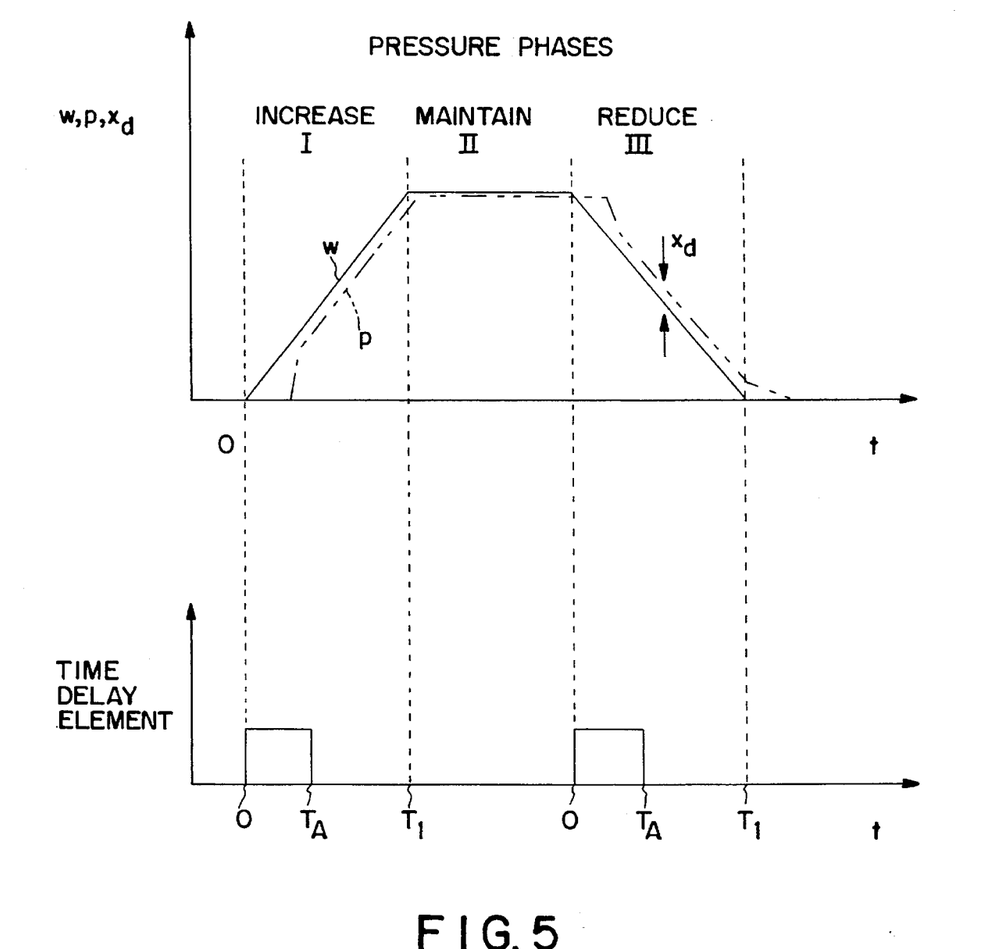
FIG. 5 is a diagram illustrating a typical course of the command variable w and the resulting actual value p.

As shown in the upper half of FIG. 5, the pressure p to be controlled closely follows the command variable w and wide deviations occur only in the beginning phase of a pressure increase and a pressure reduction. As shown, the deviation $x_d$ is generally relatively low.

The control formula (PIDD$^2$ algorithm) used by the digital controllers (10, 11) may be generally represented as follows:

$$y(k) = y_v + K_P \cdot x_d(k) + K_I \cdot \sum_{i=0}^{k-1} x_d(i) + K_D \cdot x_{d\delta}(k) + K_{2D} \cdot x_{d2\delta}(k).$$

This control formula is not a representation over time as in the usual case, but is a mathematical computation because this is a digital control. y(k) is the controller output in the k-th iteration of the controlling computer as a function of the deviation $x_d$. Each of the terms in this control formula will now be discussed.

The value $Y_v$, which is added in the precontrol points (12, 13), may contain precontrol values such as the operating voltage $U_B$ and the reservoir pressure. Alternatively, value $Y_v$ may be a precontrol value suitable for overcoming the hysteresis effect of the solenoid valves. See FIGS. 2 and 3. In this case, a response value $Y_v$ is added to the controller correction value and the deviation is thus precontrolled in order to pre-adjust the operating point of the valve. However, this precontrol may not open the valve from off to high, because an over-adjustment may then occur due to the steep valve characteristic during the initial opening phase as shown in FIGS. 2 and 3. At the same time, the opening signal is very much dependent on different values, such as, the pressure drop at the valve sealing surfaces, the valve aging, the tolerance of the operating materials and the environmental temperature.

The next term $K_P \cdot x_d(k)$ comprises the proportional portion (P) of the PIDD$^2$ control formula. Here the constant $K_p$ can be altered by the pressure phase detector (18), as described further below, to reflect the current pressure phase.

The third term, $$K_I \cdot \sum_{i=0}^{k-1} x_d(i)$$

represents the integral portion (I) of the PIDD$^2$ control formula. Here too, the constant $K_I$ can be changed depending on the current pressure phase. The integral over time is approximated by means of a sum in the formula.

The fourth term $K_D \cdot x_{d\delta}(k)$ is the differential portion (D) of the PIDD$^2$ control formula. The constant $K_D$ can also be changed according to the pressure phase. The computer approximates the differential by means of a difference which is continuously updated in each iteration.

The fifth term $K_{2D} \cdot x_{d2\delta}(k)$ is the second derivative portion (D$^2$) of the PIDD$^2$ control formula. The constant $K_{2D}$ may also be changed as required.

According to the present invention, the values chosen for the constants $K_p$, $K_I$, $K_D$, $K_{2D}$ depend on the current pressure phase to be carried out.

During a pressure increase (pressure phase I), i.e., from t=0 to $T_1$ in FIG. 5, a timing circuit (28) which is contained either in the PIDD$^2$ controllers (10, 11) or in the pressure phase detector (18) is started with a delay time $T_A$ at the beginning of the pressure rise (t=0 to $T_A$). AS long as the timing circuit (28) is active, the digital controller (10) is switched to a PIDD$^2$ characteristic with the I portion dominant for the rapid setting of the setting or operating point of the inlet solenoid valve. The PIDD$^2$ portions of the controllers are then optimized for stabilization of the transient effects at the non-linear solenoid valves. The I dominance is achieved by means of a corresponding adjustment of the four constants mentioned above. The time $T_A$ of the timing circuit (28) is adjusted for an optimal integration time of the I portion for the desired setting of the inlet valve (2).

It is also possible to end the above-mentioned rapid integration (I dominance) if a predetermined (small) control deviation $x_d$ is achieved.

Wide control deviations $x_d$ are reduced rapidly by applying the above-described measures.

The discharge valve (3) always remains closed during the pressure increase phase, as long as the output pressure (p) does not overshoot and no corresponding counter-adjustment needs to take place.

At the end of the above-mentioned delay time $T_A$ and until time $T_1$, the first PIDD$^2$ controller (10) is adjusted for stabilization of transient effects in the control path, for low overshooting of further pressure build-up, and for attenuation of the pipe line harmonics when the fluid flow going to the brake cylinder has a pressure gradient of more than 10 bar/s. Adjustment of the control formula is achieved with correspondingly adapted constants, whereby the D and D$^2$ portions are correspondingly attenuated.

In pressure phase II (maintain pressure), the control formula is adjusted for low deviations $x_d$ and for attenuation of the transient effects of the valves, when the deviation $x_d$ leaves an adjustment dead zone again. See FIG. 7. This may occur when, for example, temperature fluctuation take place in the brake cylinder causing a pressure drop. In pressure phase II, the I portion of the control formula dominates.

In pressure phase III (pressure reduction), the timing circuit (28) is also started with a delay time $T_A$. If necessary, the delay time of the timing circuit can also be changed from the above-mentioned value of $T_A$. As long as the delay $T_A$ is active, the second PIDD$^2$ controller (11) is adjusted for rapid setting of the operating point of the setting or discharge valve (3) by providing PIDD$^2$ controller (II) with I dominance. Subsequently, the PIDD$^2$ portions are optimized for the stabilization of the transient effects at the non-linear solenoid valve, outlet valve (3).

During pressure reduction phase III, the factor $K_I$ in the control formula for the inlet valve (2) is set to zero as long as no overshooting and counter-adjustment takes place.

At the end of the delay time $T_A$ and until a point in time $T_1$ is reached, the control formula is adjusted for stabilization of the transient effects as aeration takes place in the control path, for low-overshooting of pressure reduction, and for attenuation of the pipe line harmonics when the fluid flow going from the brake cylinder to the discharge valve (3) and the outlet (27) has a greater pressure gradient than −10 bar/s.

The two PIDD$^2$ controllers (10, 11) are followed by the three-stage controller (14) which outputs the digital setting correction values calculated by the controllers (10, 11) to the solenoid valves (23). The three-stage controller (14) also carries out a number of other functions at the same time.

For example, the two solenoid valves (2, 3) may not be triggered at the same time. This would result in an unnecessary loss of pressure fluid. Therefore, the three-stage controller (14) always transmits only one control signal, even if two control signals are received.

Especially while low pressure gradients and minimal existing deviations prevailing during the maintain pressure phase (II), a surge of adjustments and constant switching of the solenoid valves may result. This is not desirable. The three-stage controller (14) suppresses such a surge of adjustments because the average filtered deviation $\bar{x}_d$ which is fed via the filter (15) is used as a reversal criterion for the three-stage function. Based on the sign (positive or negative) of this average filtered deviation, the solenoid valve (EV (2) or AV (3)) is selected to which the controller (14) output, as calculated by the controllers (10, 11), is to be transmitted.

In addition, the rapidness of the change of the controller (14) output is limited in the maintain pressure phase (II) by switchable low-pass filters (16, 17). A so-called over-regulation by over-adjusting the solenoid valves (EV (2), AV (3)) is thereby reduced or slowed down. Over-regulation in this case, means that the solenoid valves are adjusted up or down unnecessarily beyond their operating limits. Such over-regulation would produce unnecessary hysteresis behavior in the valves.

The above-mentioned low-pass filter function causes a quasilinearization of the otherwise abrupt triggering of the solenoid valves. Abrupt triggering is normally typical with three-stage controllers and actuators with steep operating characteristics. Linearization is especially advantageous when very minor deviations are to be compensated for.

With higher desired pressure gradients, interfering signal peaks and pressure oscillations with overcompensation occur in the path (26). These pressure oscillations are produced due to the harmonic characteristics of the pipe lines and cannot be suppressed by filtering because the response time until reversal of the valves would then be too great.

In order to suppress harmonic characteristics of the two solenoid valves due to high desired pressure gradients, the criteria for reversal are changed in the three-stage controller (14) during the pressure phases (I) and (III). Therefore, even a greater brief deviation does not immediately cause the occurrence of a counter-adjustment with opposite phase by the valve (see FIGS. 6, 7, and 8).

Figure 6:
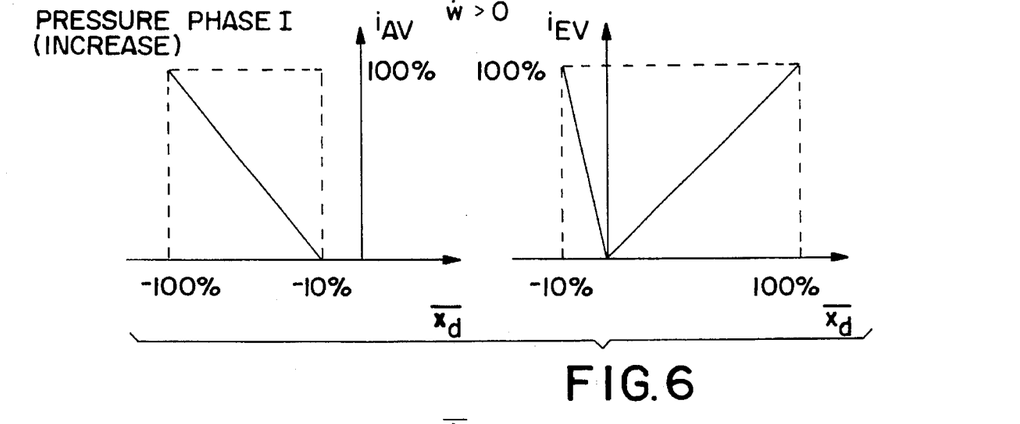
FIGS. 6, 7 & 8 are diagrams illustrating the operation of a three-stage controller to suppress harmonic characteristics of the solenoid valves.

In FIG. 6 the change which occurs when $\dot{w}>0$, i.e., the command variable w rising in pressure phase (I), is shown. On the left side of FIG. 6, which diagrams $i_{AV}$ (control current for outlet valve), a controller output (y) is set for the outlet valve (3), up to the highest possible value of 100% $i_{AV}$, when the average deviation $(\bar{X}_d)$ exceeds a value of –10%. This is the case after a pressure value (dead zone) of approximately 1 bar. Of course, the outlet valve is during phase I only operated, if the actual pressure is above the command variable w (not shown in FIG. 5).

The inlet valve (EV) (2) is actuated when the average deviation $(\bar{X}_d)$ is between –10% and +100%, as shown on the right side of FIG. 6. The controller output (y) calculated by the controllers (10, 11) is then transmitted by the three-stage controller (14) up to its possible maximum value of 100% $i_{EV}$.

Figure 7:
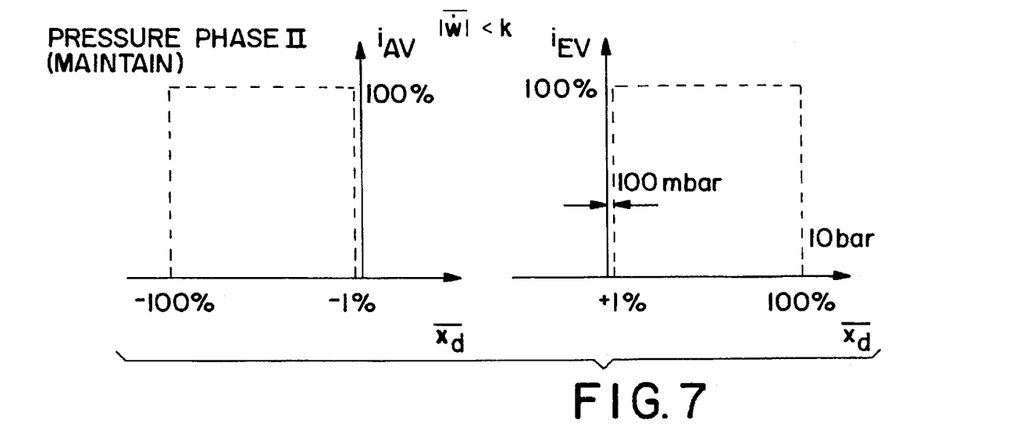

FIG. 7 illustrates the maintain pressure phase (II) during which the amount of the average change of the command variable $\dot{w}$ is less than a small constant ($|\dot{w}|$)<k). The controller outputs (y) for the discharge valve (3) and the inlet valve (2) are allowed through only when the average deviation $(\bar{X}_d)$ exceeds 1% in either the negative or positive direction (dead zone). This would be approximately equal to a pressure value of 100 mbar. The final value 100% for pressure phase II amounts to approximately 10 bar.

Figure 8:
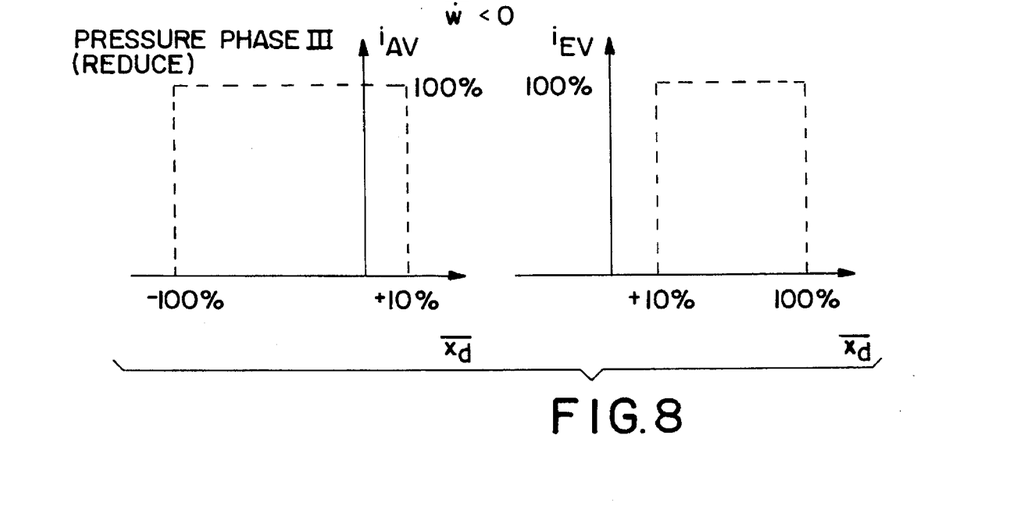

In the pressure reduction phase (III) where $\dot{w}<0$ shown in FIG. 8, the discharge valve (3) is actuated when the average deviation $(\bar{X}_d)$ is between +10% and –100% The inlet valve (2), on the other hand is actuated when the average deviation $(\bar{X}_d)$ is between +10% and +100%. The points 10% or 100% represent pressure values of 1 and 10 bar, respectively.

In FIG. 6, diagonals on which the operating points of the valves may be located depending on the controller outputs (y) calculated by the controllers (10, 11) are drawn within the hatched, possible current ranges.

As a further improvement of the described control, the threshold for the average deviation $(\bar{X}_d)$ may also be selected as a function in proportion to the amount of the average desired pressure gradient. Exceeding the threshold will cause a counter-adjustment to begin. The points of adjustment, see FIGS. 6 to 8, are not fixed but can shift depending on the rapidness of the change of the desired pressure or command variable w.

Digital/analog converters (not shown) for analog actuation of the amplifiers (7, 8) or of the solenoid valves (2, 3) are located downstream of the three-stage controller (14), between the low pass filters (16, 17) and the amplifiers (7, 8).

While the invention has been described by reference to specific embodiments, this was for purposes of illustration only. Numerous alternative embodiments will be apparent to those skilled in the art and are considered to be within the scope of the invention.

We claim:

1. Pressure control apparatus for adjusting a brake pressure in a brake system of a vehicle, comprising
   a reservoir in which a pressure fluid is stored,
   an outlet through which said pressure fluid is discharged,
   at least one brake cylinder of said brake system,
   an inlet valve through which said pressure fluid is supplied from said reservoir to said brake cylinder,
   an outlet valve through which said pressure fluid is discharged from said brake cylinder to said outlet and
   a digital controller which controls the opening and closing of said inlet and outlet valves, said digital controller operating in accordance with a control formula to minimize a deviation between an actual value and a command variable,
   wherein said digital controller comprises a pressure phase detector which recognizes a current pressure phase determined by said command variable and adjusts said control formula as a function of said current pressure phase.

2. The pressure control apparatus of claim 1 wherein said pressure phase detector recognizes pressure increase, maintain pressure, and pressure decrease as current pressure phases of said command variable.

3. The pressure control apparatus of claim 1 wherein said digital controller further comprises individual controllers for each of said inlet and outlet valves, a three-stage controller, and low pass filters for each of said inlet and outlet valves, connected in series.

4. The pressure control apparatus of claim 3 wherein each of said individual controllers operates in accordance with a PIDD$^2$ control formula, wherein said PIDD$^2$ control formula includes a proportional portion, an integral portion, a differential portion, and a second differential portion.

5. The pressure control apparatus of claim 1 wherein said digital controller comprises
   individual controllers for each of said inlet and outlet valves, each of said individual controllers operating in accordance with its own changeable individual control formula, a three-stage controller connected to said individual controllers and operating in accordance with a control strategy, said control strategy depending on an average deviation between said actual value and said command variable supplied to said three-stage controller via a first low pass filter, a second and a third low pass filter for each of said inlet and outlet valves connected to said three-stage controller which delimit the rapidity of change of an output value produced by said digital controller for each of said inlet and outlet valves, wherein the output of said pressure phase detector is connected to said individual controllers, said three-stage controller, and said second and third low pass filters, and wherein said pressure phase detector recognizes pressure increase, maintain pressure, and pressure decrease as current pressure phases selected by said command variable.

6. The pressure control apparatus of claim 5 wherein each of said individual controllers operates in accordance with a $PIDD^2$ control formula, wherein said control formula includes a proportional portion, an integral portion, a differential portion, and a second differential portion.

7. The pressure control apparatus of claim 6 further comprising a timing element with a delay time, said timing element adjusting said $PIDD^2$ of each of said control formulas so that said integral portion predominates during said delay time.

8. The pressure control apparatus of claim 7 wherein said delay time is coordinated with the integration time to achieve the setting points of said inlet and outlet valves and lasts about 100 ms.

9. The pressure control apparatus of claim 7 wherein said delay time is terminated when the deviation is equal to a predetermined value.

10. The pressure control apparatus of claim 6 wherein a precontrolling value is added to the outputs of said individual controllers in order to account for hysteresis effects in said inlet and outlet valves.

11. A method for adjusting a brake pressure in a brake system of a vehicle, wherein said brake system comprises a reservoir in which a pressure fluid is stored, an outlet through which said pressure fluid is discharged, at least one brake cylinder, an inlet valve through which said pressure fluid is supplied from said reservoir to said brake cylinder, and an outlet valve through which said pressure fluid is discharged from said brake cylinder to said outlet, said method comprising:

controlling the opening and closing of said inlet and outlet valve in accordance with a control formula to minimize a deviation between an actual value and a command variable, detecting a current pressure phase determined by said command variable, and adjusting said control formula as a function of said current pressure phase.

12. The method of claim 11 wherein said actual value is an actual pressure value.

13. The method of claim 12 wherein said current pressure phase is a pressure increase phase, a maintain pressure phase, or a pressure decrease phase.

14. The method of claim 13 wherein said control formula comprises a $PIDD^2$ control formula, wherein said $PIDD^2$ control formula includes a proportional portion, an integral portion, a differential portion, and a second differential portion.

15. The method of claim 14 wherein each of said inlet and outlet valves is controlled in accordance with a separate control formula assigned to it, each of said separate control formulas comprising a $PIDD^2$ control formula which includes a proportional portion, an integral portion, a differential portion, and a second differential portion.

16. The method of claim 15 further comprising adjusting said $PIDD^2$ control formulas so that said integral portion predominates during a delay time.

17. The method of claim 16 wherein said delay time is coordinated with the integration time to achieve setting points of said inlet and outlet valves and lasts about 100 ms.

18. The method of claim 17 wherein said delay time is terminated when the deviation is equal to a predetermined value.

* * * * *